United States Patent
Tallet et al.

(10) Patent No.: US 8,059,668 B2
(45) Date of Patent: Nov. 15, 2011

(54) EFFICIENT END-TO-END PROPOSAL/AGREEMENT MESSAGING FOR SPANNING TREE CONVERGENCE IN A COMPUTER NETWORK

(75) Inventors: Francois Edouard Tallet, Santa Clara, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 12/020,426

(22) Filed: Jan. 25, 2008

(65) Prior Publication Data

US 2009/0190503 A1 Jul. 30, 2009

(51) Int. Cl.
*H04L 12/28* (2006.01)

(52) U.S. Cl. ........ 370/402; 370/254; 370/255; 370/256; 370/351; 370/389; 370/400; 370/401

(58) Field of Classification Search ................ 370/351, 370/352, 356, 357, 400, 402, 254, 255, 256, 370/389, 401
See application file for complete search history.

(56) References Cited

U.S. PATENT DOCUMENTS

| | | | |
|---|---|---|---|
| 5,883,881 A * | 3/1999 | Croslin | 370/221 |
| 6,032,194 A | 2/2000 | Gai et al. | |
| 6,202,114 B1 | 3/2001 | Dutt et al. | |
| 6,219,739 B1 | 4/2001 | Dutt et al. | |
| 6,480,502 B1 * | 11/2002 | Abadi et al. | 370/432 |
| 6,535,491 B2 * | 3/2003 | Gai et al. | 370/256 |
| 6,801,506 B1 | 10/2004 | Dey | |
| 6,898,189 B1 | 5/2005 | Di Benedetto et al. | |
| 7,023,808 B2 | 4/2006 | Ball et al. | |
| 7,292,581 B2 | 11/2007 | Finn | |
| 7,318,108 B2 | 1/2008 | Sreekantiah et al. | |
| 7,817,580 B2 * | 10/2010 | Jain et al. | 370/254 |
| 2005/0117593 A1 * | 6/2005 | Shand | 370/401 |
| 2006/0072461 A1 | 4/2006 | Luong et al. | |
| 2006/0146845 A1 * | 7/2006 | Rose | 370/402 |
| 2006/0218301 A1 | 9/2006 | O'Toole et al. | |
| 2006/0253561 A1 * | 11/2006 | Holmeide et al. | 709/223 |
| 2007/0008953 A1 | 1/2007 | Wing et al. | |
| 2007/0124498 A1 * | 5/2007 | Kaluve et al. | 709/242 |

OTHER PUBLICATIONS

Wojdak, Rapid Spanning Tree Protocol: A New Solution from an Old Technology, Compact PCI systems, Mar. 2003.*
Ben-Ari, Bridges, RSTP-Rapid Spanning Tree Protocol, 2005.*

* cited by examiner

*Primary Examiner* — Hassan Phillips
*Assistant Examiner* — Gautam Sharma
(74) *Attorney, Agent, or Firm* — Cesari and McKenna, LLP (57) ABSTRACT

In one embodiment, a bridge may receive a first convergence proposal on a root port from an upstream adjacent bridge of a computer network, and in response, may transmit a second convergence proposal downstream on each non-edge designated port of the bridge without syncing the non-edge designated ports. The bridge may then return a convergence agreement to the adjacent bridge in response to the non-edge designated ports having received a returned convergence agreement (or in response to having only edge designated ports). Also, according to embodiments, the adjacent bridge blocks a link to the root port until the convergence proposal(s) and agreement(s) travel end-to-end.

30 Claims, 5 Drawing Sheets

EFFICIENT END-TO-END PROPOSAL/AGREEMENT MESSAGING FOR SPANNING TREE CONVERGENCE IN A COMPUTER NETWORK

TECHNICAL FIELD

The present disclosure relates generally to computer networks, and, more particularly, to spanning tree convergence in computer networks.

BACKGROUND

Computer networks often employ one or more network protocols in order to manage the transmission of traffic through the network, such as to avoid loops and to converge in response to changes in network topology. For instance, spanning tree protocols (STPs), such as the Rapid Spanning Tree Protocol (RSTP) or the Multiple Spanning Tree (MST) protocol, may be used for these (and other) purposes. A spanning tree, as will be understood by those skilled in the art, is a logical structure used by forwarding mechanisms of bridges/switches within the network to ensure that all other devices within the network are reachable from a single device within the network (a "root" bridge, e.g., based on a priority level) along a distinct and non-looping path (e.g., to "edge" or "leaf" bridges). RSTP and MST may thus be employed on the network devices (bridges) to establish and maintain the spanning tree, and should each have the ability to quickly converge a network (e.g., a large network) in response to topology changes (e.g., within milliseconds).

Preventing RSTP and MST from quickly converging (or "reconverging", used interchangeably herein), however, are certain problems inherent within the protocols or on the devices operating the protocols themselves. For instance, as may be appreciated by those skilled in the art, the detection of a link failure may not occur for some time after the actual failure, e.g., based on loss of communicated "hello" messages between devices over the link in question. Also, quick convergence assumes that the STP executes as soon as it receives new information (e.g., a Bridge Protocol Data Unit or "BPDU", or link failure indication) of a topology change. However, the STP is not always executed immediately in response to receiving such event notifications.

In addition, STP convergence (e.g., particularly RSTP and MST) involves the use of a proposal/agreement mechanism that utilizes synchronization or "sync" operations, where changes are made to port states on each bridge (e.g., between blocking/discarding and unblocking/forwarding) in order to propagate a topology change through BPDUs (converging). These sync operations require the STP to wait for port state changes to be completed for potentially several ports before proceeding, where each port state change itself induces a non-negligible processing delay. Further, where the state change is implemented by a different process on a bridge than the STP, more time may be lost before this process is scheduled, and may require communication between different processes/components on distributed platforms. Accordingly, the spanning tree is able to converge as quickly as the BPDUs reach the leaves of the tree; however, where this propagation is slowed for the reasons above, the convergence is also slowed.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a bridge may receive a first convergence proposal on a root port from an upstream adjacent bridge of a computer network, and in response, may transmit a second convergence proposal downstream on each non-edge designated port of the bridge without syncing the non-edge designated ports. The bridge may then return a convergence agreement to the adjacent bridge in response to the non-edge designated ports having received a returned convergence agreement (or in response to having only edge designated ports). Also, according to embodiments, the adjacent bridge blocks a link to the root port until the convergence proposal(s) and agreement(s) travel end-to-end.

Description

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge may be used to provide a "bridging" function between two or more LANs or end stations. Typically, the bridge is a computer and includes a plurality of ports that are coupled to the LANs or end stations. Ports used to couple bridges to each other are generally referred to as a trunk ports, whereas ports used to couple bridges to LANs or end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer 2 (L2) which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

Other devices, commonly referred to as routers, may operate at higher communication layers, such as Layer 3 (L3) of the OSI Reference Model, which in Transmission Control Protocol/Internet Protocol (TCP/IP) networks corresponds to the Internet Protocol (IP) layer. Packets at the IP layer also include a header which contains an IP source address and an IP destination address. Routers or L3 switches may re-assemble or convert received data frames from one LAN standard (e.g., Ethernet) to another (e.g. token ring). Thus, L3 devices are often used to interconnect dissimilar subnetworks.

Figure 1:
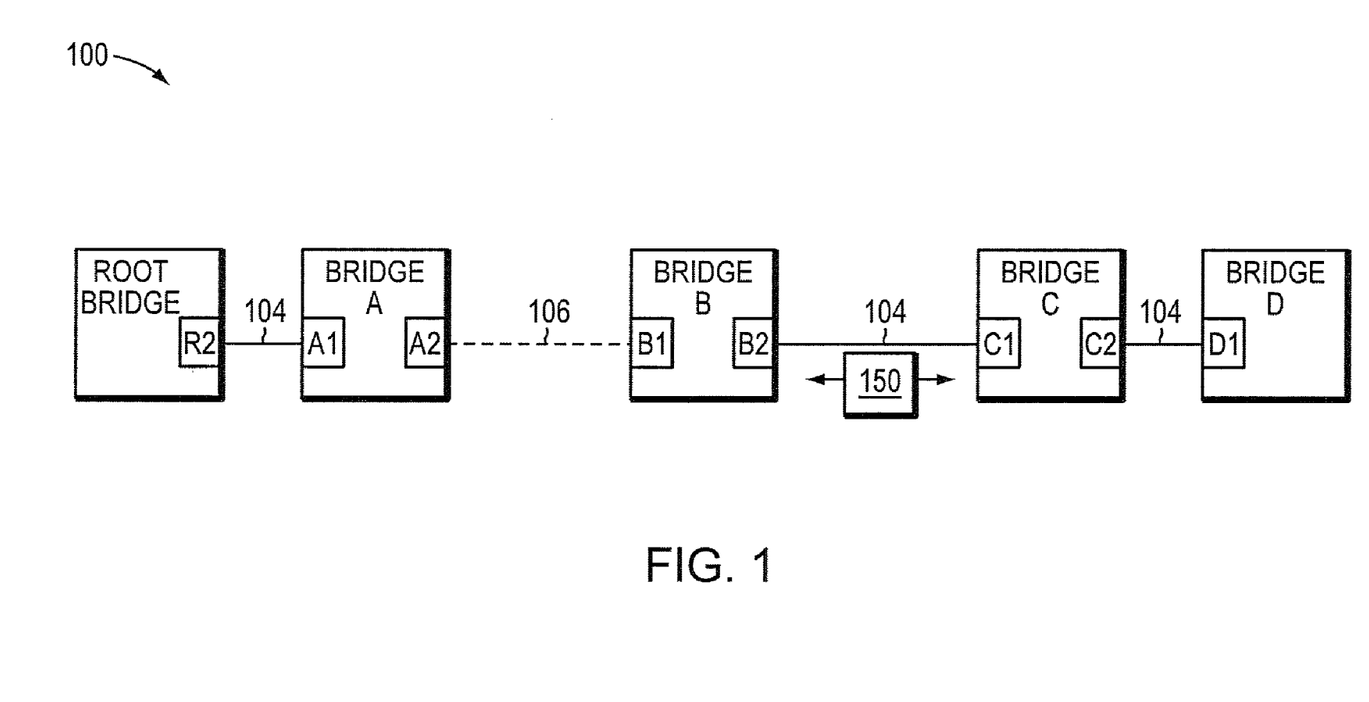
FIG. 1 illustrates an example computer network.

FIG. 1 is a schematic block diagram of an example computer network 100 illustratively comprising nodes/devices, such as Bridges "A-D" and "ROOT", interconnected by links (104 and 106, described herein) as shown. For instance, bridges may interconnect with a link via a port, e.g., labeled as "A1," "A2," "B1," "B2," etc. Those skilled in the art will understand that any number of nodes, devices, links, etc. may be used in the computer network, and that the view shown herein is for simplicity. For example, while the network 100 of bridges is shown as a simple segment of a small number of bridges, the embodiments described herein may also be applicable to "chains" or "rings" of bridges, e.g., large numbers of bridges. Those skilled in the art will also understand that while the embodiments described herein are described generally, they may apply to any network configuration within an Autonomous System (AS) or area, or throughout multiple ASes or areas, etc. The computer network 100 of FIG. 1 is meant for illustration purposes only and is not meant to limit the embodiments described herein.

Frames 150 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. As such, each bridge includes one or more ports/interfaces for receiving and forwarding the network messages.

Figure 2:
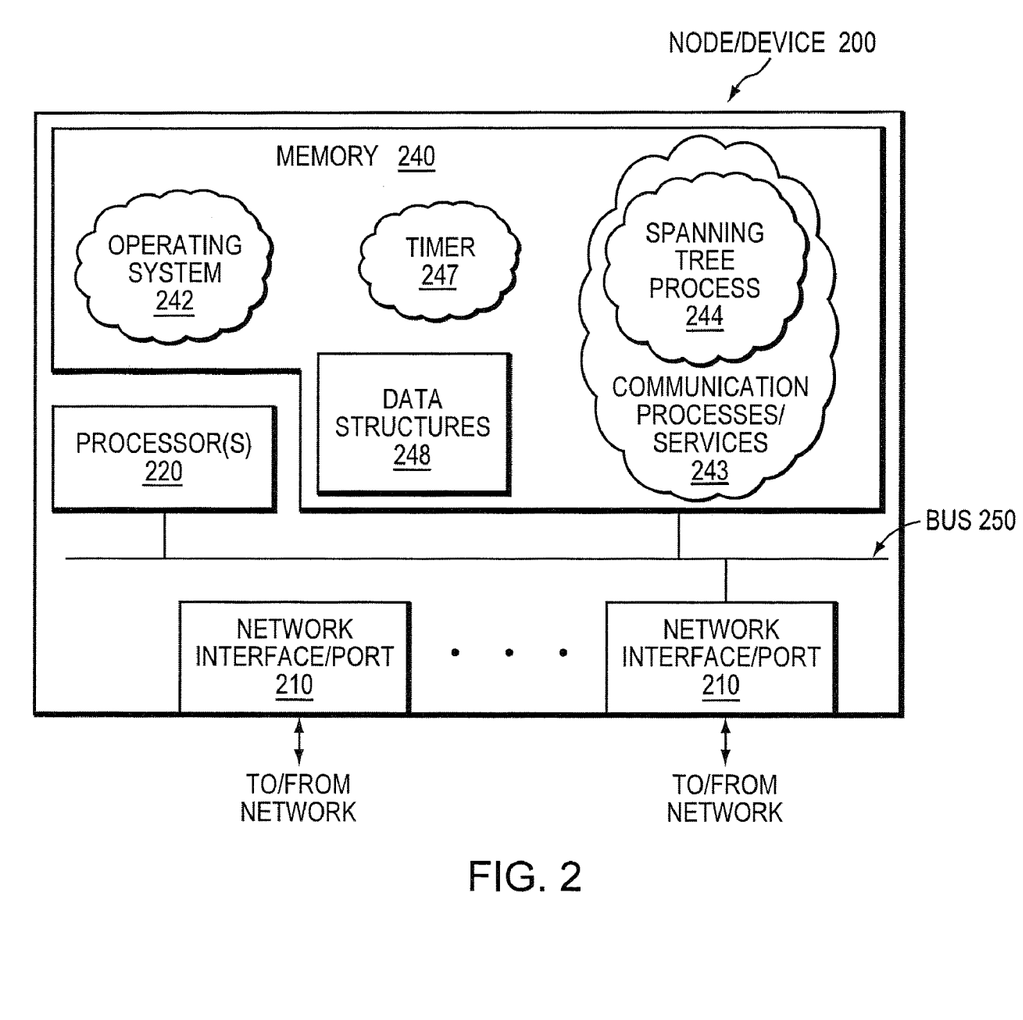
FIG. 2 illustrates an example network device/node.

FIG. 2 is a schematic block diagram of an example node/device 200 that may be advantageously used with one or more embodiments described herein, e.g., as a bridge. The device comprises a plurality of network interfaces or ports 210, one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (frames 150) using a variety of different communication protocols over physical links or wireless links. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs), as will be understood by those skilled in the art. Illustratively, the handling of frames 150 within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures 248. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise communication process/services 243, spanning tree process 244, and a timer process 247. It will be apparent to those skilled in the art that other processor and memory means, including various computer-readable media, may be used to store and execute program instructions pertaining to the inventive technique described herein.

Communication process/services 243 contain computer executable instructions executed by the processors 220 to perform functions provided by one or more communication protocols, such as various switching/bridging protocols. These functions may be configured to manage switching databases (e.g., spanning tree instances, a data structure 248), filtering databases (FDBs, a data structure 248), or forwarding information databases (FIBs, a data structure 248) containing, e.g., data used to make switching/forwarding decisions. In particular, as part of communication process/services 243, a spanning tree process 244 may execute to perform functions provided by one or more spanning tree protocols (STPs), such as the known Rapid STP (RSTP) and/or Multiple STP (MST), in addition to the novel techniques described herein.

Illustratively, RSTP and MST may be employed on the network devices (bridges) to establish and maintain one or more spanning tree instances (structure 248), converging the network in response to topology changes. For instance, while non-rapid STP uses timers to ensure the propagation of new information to the entire network, RSTP propagates a "cut" toward the leaves of the network using a proposal/agreement mechanism. For example, in accordance with RSTP, network convergence may be achieved by "splitting" the network into two parts: one part that agrees with the new information injected into the network (has converged), and one part that does not agree yet (has not received the new information). For the STP to function properly, the two parts cannot communicate because, e.g., designated ports on switches/bridges in the converged part lead to the switches that have not converged yet are put in the discarding state ("blocking" the port) by a synchronization (or "sync") mechanism. In particular, the sync mechanism essentially propagates a wave of "cuts" that split/partition the network from the location where the new information has been introduced toward the leaves of the tree. When this wave reaches all of the leaves of the tree, then all the bridges/switches are in the converged part, and full connectivity is available (i.e., the spanning tree has converged).

Figure 3A:
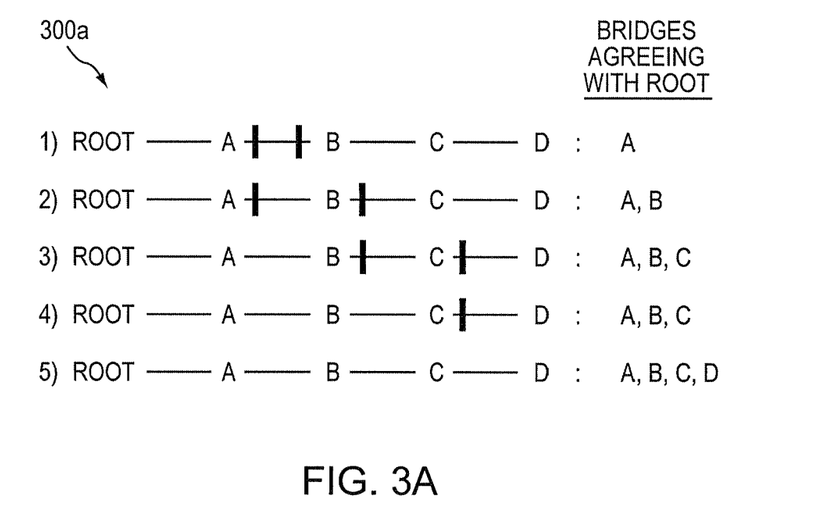
FIGS. 3A-3B illustrate an example proposal/agreement exchange.
Figure 3B:
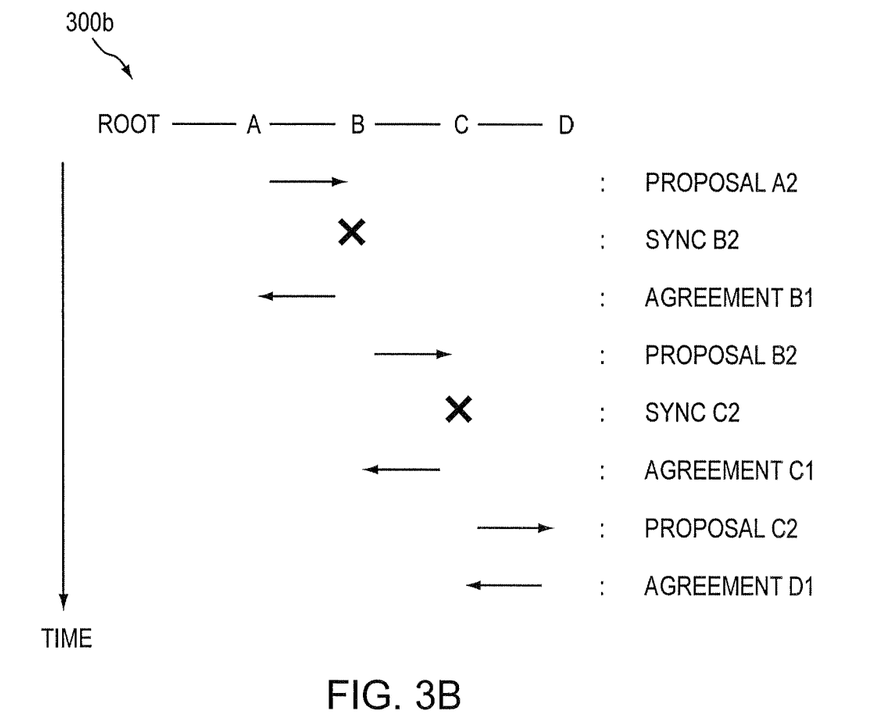

As mentioned, the "cut" traverses the tree downstream using the proposal/agreement mechanism. FIGS. 3A and 3B illustrate an example proposal/agreement exchange 300(*a* and *b*) in this manner. For instance, FIG. 3A illustrates the propagation of the cut through a tree, while FIG. 3B illustrates the transmission of proposals and agreements, as well as sync operations (syncs). Assume, as will be appreciated by those skilled in the art, that bridge ROOT has the highest priority in network 100, and will become the root of the entire network 100 (i.e., the root of the spanning tree), and that before link 106 between Bridge A and Bridge B is added (or returned to service), that Bridge D is the root of the network (for Bridges B, C, and D). Also, for ease of description, each bridge may be referred to simply as its designated letter, and each port of the bridges are referenced by their respective labels as shown in FIG. 1 (but not FIG. 3A or 3B for clarity), such as "B1" and "B2", etc.

In particular, referring to FIGS. 3A and 3B:

1.) Link 106 between A and B is detected (added/restored) between A2 and B1. Both ports start in discarding/blocking states (designated by "|"). A2 sends a convergence proposal (proposes) to B1 ("proposal A2" in FIG. 3B). (Note that B1 also proposes to A2, but the proposal is ignored by A2, as will be appreciated by those skilled in the art.)

2.) B1 receives A1's proposal and is elected the root port of B, and its state is changed to forwarding/unblocked. At the same time, B syncs B2 (B2 is put in discarding/blocking state), thus implying that B has joined the network rooted in ROOT (i.e., has converged). The network is now partitioned between bridges that know about ROOT (ROOT, A, B) and those that don't (C, D). Because B has cut its link to all the bridges that have not received the information from ROOT, it is now safe to unblock A2. To this effect, B1 sends an agreement to A2, ensuring that bridges/devices downstream from A2 "agree" with the spanning tree rooted at ROOT. At the same time, B is proposing to C (B2 proposes to C1).

3.) A2 receives the agreement from B and its state is changed to forwarding/unblocked. C receives the proposal from B and syncs its port C2 (its state is changed to discarding/blocked). As a result, C now agrees with the spanning tree rooted at ROOT, and sends an agreement to B. At the same time, C proposes to D.

4.) B2 receives the agreement from C1 and its state is changed to forwarding/unblocked. D receives the proposal from C but does not need to sync any port (e.g., it is a leaf bridge with only edge ports), and thus returns an agreement to C.

5.) C receives the agreement from D and the state of C2 is changed to forwarding/unblocked.

In other words, when a proposal is received on a root port, the receiving bridge syncs all its non-edge designated ports, proposes on its designated discarding ports (thus propagating the cut), and returns an agreement upstream when all the non-edge designated ports agree (i.e., are synced). In particular, the portion of the network that is "aware of" (has received) the new information is separated from the portion that has not received the new information by the sync of designated ports. This cut, introduced by the syncs, travels down the tree until it reaches the leaves. When the information has reached all the bridges/switches in the network, the convergence has been achieved (without the use of a delay timer, an in non-rapid STP).

As noted, however, the sync operations of RSTP require the STP to wait for port state changes to be completed for potentially several ports before proceeding, where each port state change itself induces a non-negligible processing delay. That is, blocking and unblocking ports can be computationally expensive. Accordingly, the spanning tree is able to converge as quickly as the BPDUs reach the leaves of the tree; however, where this propagation is slowed, particularly by sync operations, the convergence is also slowed.

Efficient Spanning Tree Convergence Using Proposal/Agreement Mechanisms

According to embodiments of the disclosure, instead of propagating a cut toward the edge of the network, the network stays partitioned at the location where the new information was generated. The relevant (blocking) port only unblocks when it has received an agreement from all the leaves of the tree. In this manner, the embodiments described herein remove sync operations from the proposal/agreement mechanism, and thus accelerate convergence of an L2 network from end-to-end, rather than requiring syncs as in the hop-per-hop convergence in FIGS. 3A and 3B.

Illustratively, the techniques described herein may be performed by hardware, software, and/or firmware, such as various communication processes/services 243, e.g., in conjunction with spanning tree process 244 (STP). These processes and/or services may be configured to operate in accordance with certain protocols (e.g., RSTP and/or MST), and in accordance with the techniques described herein.

Figure 4A:
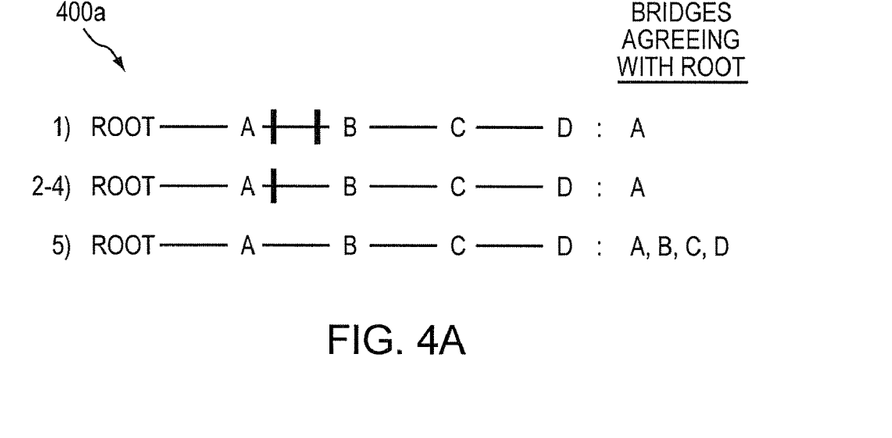
FIGS. 4A-4B illustrate an example proposal/agreement exchange.
Figure 4B:
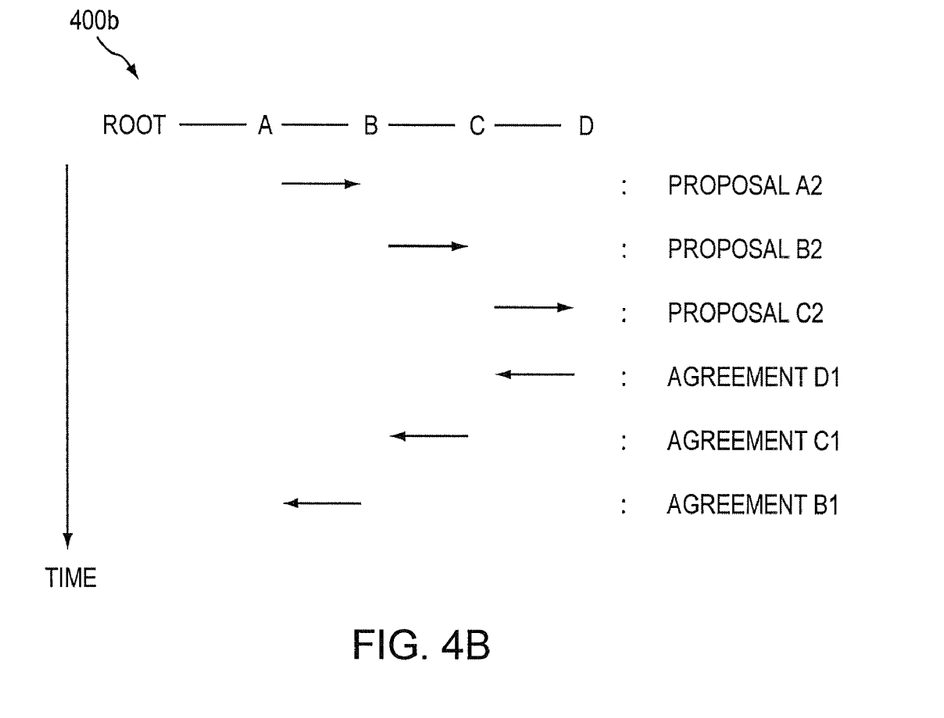

Operationally, a bridge receiving a convergence proposal cannot return a convergence agreement before all of its downstream designated ports agree with the new information. Due to the fact that the designated ports are no longer synced, the bridge receives an agreement on each designated port before it can itself return an agreement upstream. FIGS. 4A and 4B illustrate an example proposal/agreement exchange 400(a and b) in accordance with one or more embodiments described herein. For instance, FIG. 4A illustrates the propagation of proposals through a tree, while FIG. 4B illustrates the transmission of proposals and agreements. (Assume the same scenario and labeling convention used in FIGS. 3A and 3B are applied.)

In particular, referring to FIGS. 4A and 4B in accordance with one or more embodiments described herein:

1.) Link 106 is detected (e.g., added or restored) between A and B (where A is upstream and adjacent to B via the link), and A2 and B1 start in the discarding/blocking state.

2.) A2 transmits a convergence proposal (proposes) to B1. B1 receives the proposal, and may be elected as the root port of B, and its state is changed to forwarding/unblocked. However, since the (non-edge) designated port B2 is not synced, no convergence agreement (agreement) can be sent to A1 until B2 agrees. Thus, A1 stays in the discarding/blocking state.

3.) B2 transmits a proposal downstream on each of its non-edge designated ports, e.g., to C. C elects C1 as its new root port and proposes on C2 to D. Again, no agreement can be returned from C to B until C2 agrees.

4.) D receives the proposal from C, and elects D1 as its new root port. Because D does not have any non-edge designated ports (e.g., has only edge designated ports or other blocked ports), D can return an agreement to C2. (Note that a port may be configured as an edge port, e.g., by an administrator or other process.) In response to receiving the agreement on C2 from D1, C can then send an agreement to B, which can in turn send an agreement to A. (Notably, in the case of a ring of bridges, as will be understood by those skilled in the art, Bridge D would have only edge ports and an "alternate" port.)

5.) A2 may receive the returned convergence agreement from B, and may thus change its state to forwarding/unblocked, and the network has converged.

As a result of removing the sync operations, the proposal/agreement mechanism is modified to implement an end-to-end propagation/exchange of convergence information, rather than the hop-by-hop exchange in FIGS. 3A and 3B. For instance, by comparison of FIG. 3B to FIG. 4B, one may appreciate that the same messages (e.g., BPDUs) are exchanged, i.e., proposals and agreements, however their specific order is changed from bi-directional hop-by-hop proposals/agreements to an end-to-end proposal/agreement that alleviates the need for sync operations. Considering that the sync operations are an expensive operation (e.g., due to scheduling time and hardware programming time), the overall convergence time of the spanning tree may be greatly improved.

In other words, by allowing the blocking port (A2) to unblock only when it has received an agreement from all the leaves of the tree, the techniques described herein save the time associated with blocking and unblocking each downstream port of the entire tree, since only the first blocking port (A2) has to block and unblock. (Note that message transmission time for the proposals and agreements may remain substantially the same, but by removing the sync operations, the overall convergence time may be reduced.) This is particularly the case where long chains or rings of bridges would result in a large number of consecutive sync operations; thus the techniques above would alleviate that large number of sync operations, and the associated delay.

Notably, a "proposing timer" may be initiated on each non-edge designated port of a bridge upon receiving the convergence proposal from an upstream adjacent bridge. This timer (247) may be used to determine whether or not to return a convergence agreement to the adjacent bridge. For instance, each port running the proposing timer may propose to a downstream bridge/port until the timer expires or an agreement is received (in which case, the timer may be stopped). In that sense, in response to expiration of the timer prior to all of the non-edge designated ports receiving a returned convergence agreement, the bridge may determine to not return an agreement to the upstream adjacent bridge, and the network remains unconverged (or, that is, converged in a separated state).

Also, when a bridge/switch proposes on a port without syncing, the bridge assumes that all the downstream bridges will be able to send an agreement. If some bridges run older versions of STP (e.g., legacy STP), or if there are some shared segments downstream (sharing a link with multiple devices), the agreement may take time (e.g., "2xforward_delay") to be returned (e.g., such that the convergence will be similar to legacy STP as defined in 802.1D-1998, as will be appreciated by those skilled in the art). According to an aspect of the one or more embodiments herein, therefore, non-edge designated ports that are in STP compatibility mode (e.g., in communication with legacy STP bridges) or that are connected to a shared segment may still be individually synced when a proposal is received. Further, in accordance with IEEE standards (the Institute of Electrical and Electronics Engineering), is it assumed that a proposal sent on a shared segment will trigger a sync from the downstream bridges. As such, in accordance with an aspect of the embodiments described herein, proposals received on a shared segment still trigger a sync of all non-edge designated ports.

Moreover, a designated port transitioning to a forwarding/unblocked state may (should) trigger a network topology change. According to the embodiments herein, this topology change occurs once all the edge ports (e.g., once D1) have agreed, and the propagation of this topology change must then travel down the tree again. As an optional optimization, designated forwarding/unblocked ports that propose to a downstream bridge/port may flush their dynamic content-addressable memory (CAM) table (a data structure (248) upon receiving an agreement. (As will be understood by those skilled in the art, a CAM table may be used by an Ethernet switch/bridge to de-reference MAC addresses of stations to the ports on which they connect to the bridge itself; i.e., the CAM table may be consulted to make frame forwarding decisions). Also, the designated blocking port (e.g., A2) could start and maintain a topology change state while it is proposing, and may release the topology change onto the tree upon receiving the agreement from all the leaves of the tree. The flushed (cleared) CAM tables may then be re-populated with the updated topology change.

Figure 5:
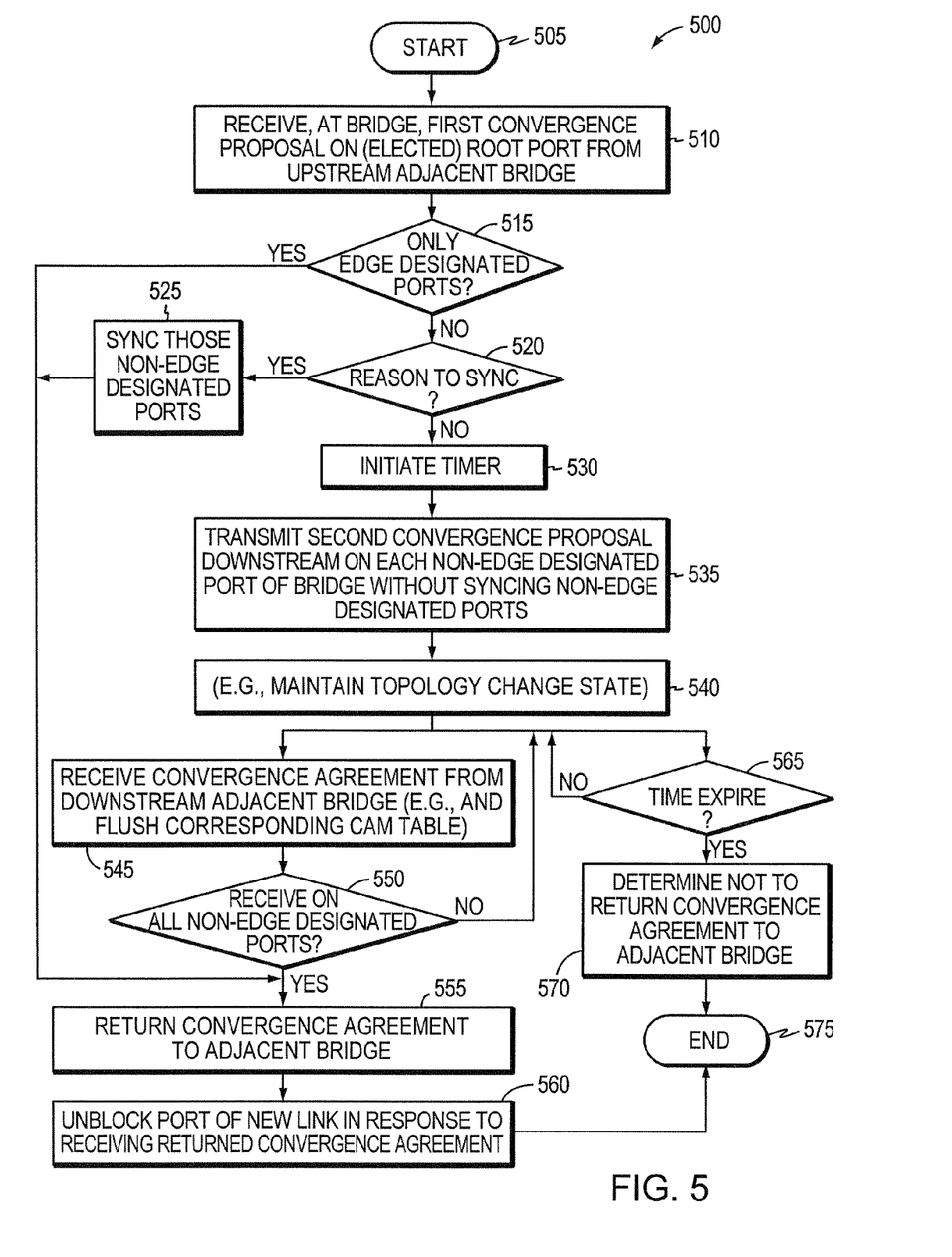
FIG. 5 illustrates an example procedure for efficiently converging a spanning tree using proposal/agreement mechanisms.

FIG. 5 illustrates an example procedure for efficiently converging a spanning tree using proposal/agreement mechanisms in accordance with one or more embodiments described herein. The procedure 500 starts at step 505, and continues to step 510, where a bridge (e.g., spanning tree process 244 of Bridges B-D) receives a first convergence proposal on a root port from upstream adjacent bridge (e.g., after electing the receiving port as the root port, mentioned above). For instance, as described above, Bridge B may receive a convergence proposal from Bridge A, Bridge C may receive a convergence proposal from Bridge B, etc. If in step 515 the receiving bridge has only edge designated ports (e.g., Bridge D), then the procedure continues to step 550 to return a convergence agreement to the adjacent bridge (e.g., for Bridge D, the adjacent bridge is Bridge C) once all ports are in agreement (step 545).

If in step 515 there are non-edge designated ports on the receiving bridge (e.g., Bridge B or Bridge C), then in step 520, the receiving bridge may determine if there are any reasons to sync the non-edge designated ports. For example, as described above, if the convergence agreement was received on a shared segment, then all non-edge designated ports are synced in step 525. Also, any ports of the receiving bridge that are in STP compatibility mode or that are in connection with a shared segment may also be synced in step 525 (and the procedure may continue to step 550-555 if all non-edge designated ports are synced).

If there is no reason to sync non-designated ports in step 520 (or if there are remaining non-designated ports that were not synced), then in step 530 a timer may be initiated (e.g., timer 247), and in step 535 the bridge may transmit a second convergence proposal downstream on each of its non-edge designated port without syncing those non-edge designated ports. For instance, as described above, Bridge B may transmit a convergence proposal downstream to Bridge C without syncing B2, Bridge C may transmit a convergence proposal downstream to Bridge D without syncing C2, etc. (Note also, that a topology change state may be maintained at each bridge in step 540 during its proposing, as mentioned above.)

In step 545, a bridge may receive a convergence agreement from a downstream adjacent bridge, that is, in response to a previously sent convergence proposal. For example, Bridge C may receive a convergence agreement from Bridge D, Bridge B may receive a convergence agreement from Bridge C, etc. (As noted above, the receiving bridge may also flush a corresponding CAM table in step 545.) Once an agreement has been received on all non-edge designated ports (e.g., all not previously synced) of the bridge in step 550, the receiving bridge may itself return convergence agreement to the upstream adjacent bridge. Once all downstream bridges have agreed, then in step 560 the blocking bridge (e.g., Bridge A) may unblock its port of the new link in response to receiving the returned convergence agreement (e.g., from Bridge B), and the procedure 500 ends in step 575. In this manner, the novel techniques provide for an end-to-end proposal/agreement mechanism for spanning tree convergence. (Notably, however, if the time expires in step 565 while waiting for all returned convergence agreements in steps 545 and 550, then in step 570 the bridge may determine not to return a convergence agreement to the upstream adjacent bridge, and the procedure ends without converging in step 575, accordingly).

Advantageously, the novel techniques described herein efficiently converge a spanning tree using proposal/agreement mechanisms in a computer network. By operating end-to-end as opposed to hop-by-hop, the novel techniques eliminate sync operations (which are expensive to implement) and global convergence time is improved. In particular, the techniques described above separate protocol processing from platform operations. For instance, MST requires very little processing to compute a new state from a new event. Also, it is possible to process a BPDU at an interrupt level (or in a process with a very high priority) and propagate the BPDU quickly, particularly, since the end-to-end proposal/agreement does not depend on any intermediate port state change. At the same time, port state changes, which may be difficult to operate at the interrupt level, can still be implemented at process level without slowing down the protocol operation.

While there have been shown and described illustrative embodiments that efficiently converge a spanning tree using proposal/agreement mechanisms in a computer network, it is to be understood that various other adaptations and modifications may be made within the spirit and scope of the present invention. For example, the embodiments have been shown and described herein with relation to various standardized protocols, such as RSTP and MST. However, the embodiments of the invention in their broader sense are not so limited, and may, in fact, be used with other suitable spanning tree protocols that exist or are to be developed.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   receiving, at a bridge, a first spanning tree convergence proposal on a root port coupled to an upstream adjacent bridge of a computer network;
   transmitting a second spanning tree convergence proposal downstream in the computer network on each non-edge designated port of the bridge without syncing the non-edge designated ports;
   receiving on each of the non-edge designated ports a returned spanning tree convergence agreement from a downstream adjacent bridge of the computer network; and
   returning a spanning tree convergence agreement to the upstream adjacent bridge in response to each of the non-edge designated ports having received a returned spanning tree convergence agreement; and
   unblocking a port of the upstream adjacent bridge coupled to the root port in response to receipt of the spanning tree convergence agreement at the upstream adjacent bridge.

2. The method as in claim 1, further comprising:
   detecting an added link on the root port to the upstream adjacent bridge; and blocking the root port for the added link.

3. The method as in claim 2, further comprising:
   unblocking the root port in response to receiving the first spanning tree convergence proposal on the root port, wherein the upstream adjacent bridge blocks the link.

4. The method as in claim 2, wherein the added link is a restored link.

5. The method as in claim 1, further comprising:
   electing the port receiving the first spanning tree convergence proposal as the root port.

6. The method as in claim 1, further comprising:
   initiating a timer upon receiving the first spanning tree convergence proposal; and
   determining not to return a spanning tree convergence agreement to the upstream adjacent bridge in response to expiration of the timer prior to all of the non-edge designated ports receiving a returned spanning tree convergence agreement.

7. The method as in claim 1, further comprising:
   in response to one or more particular non-edge designated ports being in one of either a Spanning Tree Protocol (STP) compatibility mode or in connection with a shared segment, syncing the one or more particular non-edge designated ports upon receiving the first spanning tree convergence proposal.

8. The method as in claim 1, further comprising:
   in response to receiving the first spanning tree convergence proposal on a shared segment, syncing all of the non-edge designated ports.

9. The method as in claim 1, further comprising:
   flushing a corresponding content-addressable memory (CAM) table for a port in response to receiving a spanning tree convergence agreement.

10. The method as in claim 1, further comprising:
    maintaining a topology change state after transmitting the second spanning tree convergence proposal and before receiving a returned spanning tree convergence agreement.

11. The method as in claim 1, further comprising:
    returning the spanning tree convergence agreement to the upstream adjacent bridge in response to the bridge having only edge designated ports.

12. The method as in claim 1, wherein the spanning tree convergence proposals and spanning tree convergence agreements conform to a Rapid Spanning Tree Protocol (RSTP).

13. An apparatus, comprising:
    a plurality of ports;
    a processor coupled to the ports and adapted to execute one or more processes; and
    a memory adapted to store a spanning tree process executable by each processor, the spanning tree process when executed operable to:
    receive a first spanning tree convergence proposal on a root port of the ports from an upstream adjacent bridge of a computer network that is coupled to the root port;
    transmit a second spanning tree convergence proposal downstream in the computer network on each non-edge designated port of the ports without syncing the non-edge designated ports; and
    return a spanning tree convergence agreement to the upstream adjacent bridge, in response to each of the non-edge designated ports having received a returned spanning tree convergence agreement from a downstream adjacent bridge of the computer network, the spanning tree convergence agreement to cause the upstream adjacent bridge to unblock a port of the upstream adjacent bridge coupled to the root port.

14. The apparatus as in claim 13, wherein the spanning tree process when executed is further operable to:
    detect an added link on the root port to the upstream adjacent bridge; and
    block the root port for the added link.

15. The apparatus as in claim 14, wherein the spanning tree process when executed is further operable to:
   unblock the root port in response to receiving the first spanning tree convergence proposal on the root port, wherein the upstream adjacent bridge blocks the link.

16. The apparatus as in claim 13, wherein the spanning tree process when executed is further operable to:
   initiate a timer upon receiving the first spanning tree convergence proposal; and
   determine not to return a spanning tree convergence agreement to the upstream adjacent bridge in response to expiration of the timer prior to all of the non-edge designated ports receiving a returned spanning tree convergence agreement.

17. The apparatus as in claim 13, wherein the spanning tree process when executed is further operable to:
   sync one or more particular non-edge designated ports upon receiving the first spanning tree convergence proposal in response to the particular non-edge designated ports being in one of either a Spanning Tree Protocol (STP) compatibility mode or in connection with a shared segment.

18. The apparatus as in claim 13, wherein the spanning tree process when executed is further operable to:
   receive the first spanning tree convergence proposal on a shared segment; and in response,
   sync all of the non-edge designated ports.

19. A system, comprising:
   a first bridge coupled to a computer network and configured to: i) detect an added link on a first port; ii) block the first port for the added link; and iii) transmit a spanning tree convergence proposal downstream on the first port; and
   one or more additional bridges coupled to the computer network, the additional bridges each configured to: i) receive a first spanning tree convergence proposal on a root port from the first bridge of the computer network; ii) transmit a second spanning tree convergence proposal downstream on each non-edge designated port of the additional bridge without syncing the non-edge designated ports; and iii) return a spanning tree convergence agreement to the first bridge in response to each of the non-edge designated ports having received a returned spanning tree convergence agreement from a downstream adjacent bridge of the computer network,
   wherein the first bridge is further configured to unblock the first port in response to receipt of the returned spanning tree convergence agreement on the first port of the first bridge.

20. A method, comprising:
   receiving, at a bridge from an upstream adjacent bridge of a computer network, a first bridge protocol data unit (BPDU) indicating a spanning tree convergence proposal;
   transmitting, on each non-edge designated port of the bridge to a respective downstream adjacent bridge, a second BPDU indicating a spanning tree convergence proposal, the transmitting performed without first performing a sync operation on each non-edge designated port of the bridge, and without first returning a BPDU indicating a spanning tree convergence agreement by the bridge to the upstream adjacent bridge;
   receiving, on each non-edge designated port of the bridge, a BPDU indicating a spanning tree convergence agreement by the respective downstream adjacent bridge;
   in response to receiving on each non-edge designated port of the bridge a BPDU indicating a spanning tree convergence agreement by a respective downstream adjacent bridge, returning a BPDU indicating a spanning tree convergence agreement by the bridge to the upstream adjacent bridge; and
   unblocking a port of the upstream adjacent bridge coupled to the bridge in response to receipt of the BPDU indicating a spanning tree convergence agreement at the upstream adjacent bridge.

21. The method as in claim 20, wherein performing the sync operation on each non-edge designated port of the bridge involves blocking each non-edge designated port of the bridge.

22. The method as in claim 20, further comprising:
   initiating a timer upon receiving the first BPDU indicating a spanning tree convergence proposal; and
   in response to expiration of the timer prior to receiving on each non-edge designated port of the bridge a BPDU indicating a spanning tree convergence agreement by a respective downstream adjacent bridge, determining not to return a BPDU indicating a spanning tree convergence agreement by the bridge to the upstream adjacent bridge.

23. The method as in claim 20, further comprising:
   determining that the bridge only has edge designated ports; and
   in response to determining that the bridge only has edge designated ports, returning a BPDU indicating a spanning tree convergence agreement by the bridge to the upstream adjacent bridge.

24. The method as in claim 20, further comprising:
   electing the port of the bridge receiving the first BPDU indicating a spanning tree convergence proposal as the root port of the bridge.

25. The method of claim 24, further comprising:
   initially blocking the root port of the bridge; and
   in response to receiving on each non-edge designated port of the bridge a BPDU indicating a spanning tree convergence agreement by a respective downstream adjacent bridge, unblocking the root port of the bridge.

26. An apparatus, comprising:
   a port coupling the apparatus to an upstream adjacent bridge;
   one or more non-edge designated ports coupling the apparatus to respective downstream adjacent bridges;
   a processor configured to execute one or more processes; and
   a memory configured to store a spanning tree process executable by the processor, the spanning tree process when executed operable to:
      in response to receipt on the port coupling the apparatus to the upstream adjacent bridge of a first bridge protocol data unit (BPDU) indicating a spanning tree convergence proposal, transmit on each of the one or more designated ports a second BPDU indicating a spanning tree convergence proposal, the transmission performed absent performance of a sync operation on each non-edge designated port, and absent prior return of a BPDU indicating a spanning tree convergence agreement by the apparatus to the upstream adjacent bridge; and
      in response to receipt on each non-edge designated port of a BPDU indicating a spanning tree convergence agreement by a respective downstream adjacent bridge, return a BPDU indicating a spanning tree convergence agreement by the apparatus to the upstream adjacent bridge, the BPDU indicating a spanning tree convergence agreement to cause the upstream adjacent bridge to unblock a port of the upstream adjacent bridge coupled to the apparatus.

27. The apparatus as in claim 26, wherein performance of a sync operation on each non-edge designated port of the bridge involves blocking each non-edge designated port.

28. The apparatus as in claim 26, wherein the spanning tree process when executed is further operable to:
  initiate a timer upon receiving the first BPDU indicating a spanning tree convergence proposal; and
  in response to expiration of the timer prior to receipt on each non-edge designated port of a BPDU indicating a spanning tree convergence agreement by a respective downstream adjacent bridge, determine not to return a BPDU indicating a spanning tree convergence agreement by the apparatus to the upstream adjacent bridge.

29. The apparatus as in claim 26, wherein the spanning tree process when executed is further operable to:
  elect the port coupling the apparatus to the upstream adjacent bridge as the root port of the apparatus.

30. The apparatus as in claim 29, wherein the spanning tree process when executed is further operable to:
  in response to receipt on each non-edge designated port of a BPDU indicating a spanning tree convergence agreement by a respective downstream adjacent bridge, unblock the root port of the apparatus.

* * * * *